Oct. 19, 1943.   H. GILLERSTROM   2,332,070
TAPPET APPARATUS FOR ROCK DRILLS
Filed March 17, 1942

INVENTOR.
HILMER GILLERSTROM
BY A. B. Bowman
Attorney

Patented Oct. 19, 1943

2,332,070

UNITED STATES PATENT OFFICE 2,332,070

TAPPET APPARATUS FOR ROCK DRILLS

Hilmer Gillerstrom, South Pasadena, Calif., assignor to Independent Pneumantic Tool Co., Chicago, Ill., a corporation of Delaware Application March 17, 1942, Serial No. 435,061

2 Claims. (Cl. 255—43)

My invention relates to a tappet apparatus for rock drills, more particularly the apparatus in direct cooperative relation with the drill steel or the like for tapping and turning the drill steel and the objects of my invention are:

First, to provide a tappet apparatus of this class which is very strong and durable and therefore less liable to crystallization and breaking during operation;

Second, to provide an apparatus of this class which provides a maximum of smoothness in operation;

Third, to provide an apparatus of this class which provides for substantially positive alignment of the tappet apparatus;

Fourth, to provide an apparatus of this class which may be easily and readily substituted for the conventional tappet apparatus now in use;

Fifth, to provide a tappet apparatus of this class in which the chuck driver and chuck member are cooperatively connected by means of a relatively large number of splines, thus providing greater bearing surface for the torque relation between the chuck and chuck driver, thus reducing to a minimum the liability of breakage between the chuck member and chuck driver; and Sixth, to provide an apparatus of this class which is very simple and economical of construction, efficient in its action and which will not readily deteriorate or get out of order.

Figure 2:
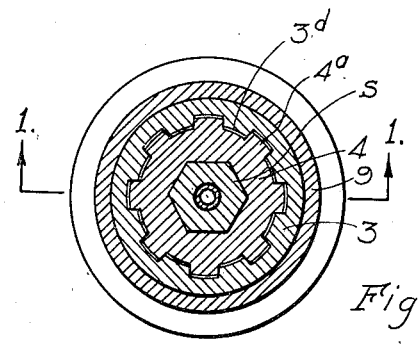
Figure 1:
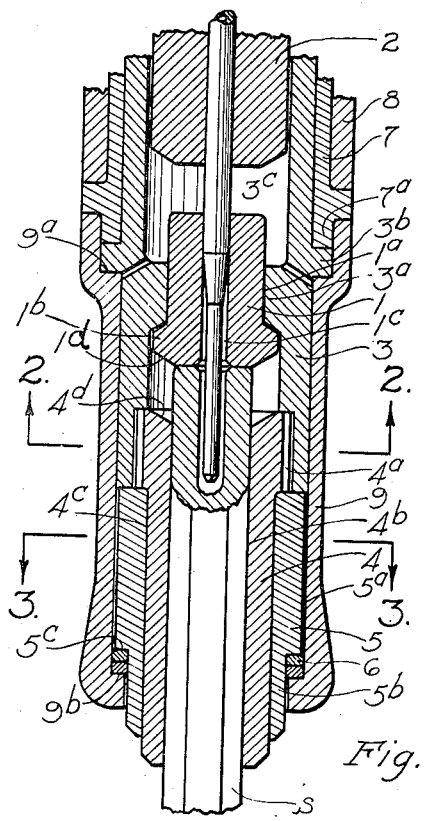
Figure 3:
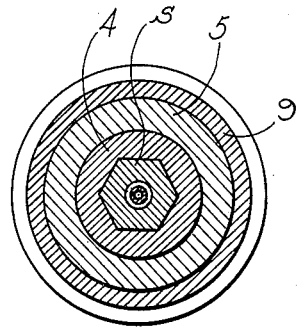

With these and other objects in view as will appear hereinafter, my invention consists of certain novel features of construction, combination and arrangement of parts and portions as will be hereinafter described in detail and particularly set forth in the appended claims, reference being had to the accompanying drawing and to the characters of reference thereon which form a part of this application in which:

Figure 1 is a longitudinal sectional view taken from the line 1—1 of Fig. 2 and showing some of the parts and portions fragmentarily and in section to facilitate the illustration; Fig. 2 is a transverse sectional view taken from the line 2—2 of Fig. 1; and Fig. 3 is a sectional view taken from the line 3—3 of Fig. 1.

Similar characters of reference refer to similar parts and portions throughout the several views of the drawing.

The tappet member 1, hammer piston 2, chuck driver 3, chuck member 4, chuck member sleeve 5, chuck wearing rings 6, cylinder liner 7, main cylinder member 8 and front head member 9 constitute the principal parts of my tappet apparatus for rock drills.

The tappet member 1 is a substantially cylindrical member with a circular outer surface 1a and with an extended circular outer surface portion 1b which forms a guide and stop in its reciprocal relation with the chuck driver 3. It is provided with a central bore 1c to provide means for fluid to pass through the rock drill into the hollow portion of the drill steel in conventional manner. However, this bore 1c may be omitted if desired.

Revolubly mounted around and in relation with the tappet member 1 is a chuck driver 3 which is provided with an inwardly extending portion 3a which is provided with a bore adapted to engage and form a bearing with the outer surface 1a of the tappet member 1. It is also provided with an outwardly extending flange portion 3b which is revolubly mounted between the end 7a of the cylinder liner 7 and a shoulder 9a on the front head 9. This chuck driver 3 is provided with a relatively large bore in which is reciprocably mounted the hammer piston 2 which is adapted to engage the upper end of the tappet member 1 as it reciprocates within the bore 3c in the chuck driver 3. This chuck driver 3 is provided at its normally lower end at its inner side with a plurality of spline members 3d which extend a considerable distance along the inner surface thereof. These spline members 3d intermesh with conforming spline members 4a on the chuck member 4.

This chuck member 4 is provided with a hexagon or other shaped opening 4b extending therethrough which is adapted to conform with and fit the outer surface of the conventional drill steel S, and this drill steel is arranged to reciprocate therein with the reciprocation of the tappet member 1 against the end of the drill steel, as shown best in Fig. 1 of the drawing. This chuck member 4 is provided with a reduced circular portion 4c which forms a bearing for and on which is revolubly mounted the chuck member sleeve 5 which is provided with a circular outer surface 5a so that the sleeve member 5 may revolve relatively to the outer surface of the portion 4c of the chuck member 4 or this outer surface may revolve in the front head 9. This sleeve 5 is provided with a reduced portion 5b which forms a shoulder 5c and positioned between this shoulder 5c and a shoulder 9a on the front head 9 are two chuck wearing rings 6 which provide thrust wearing rings between the sleeve 5 and the front head 9, as shown in Fig. 1 of the drawing.

The chuck member 4 is provided at its upper end between the spline portions 4a and the hexagon or other shaped interior with a tapered recess portion 4d which provides clearance for the tapered portion 1d on the lower side of the tappet member 1.

The operation of my tappet apparatus for rock drills is substantially as follows: The hammer piston 2 reciprocates in conventional manner in connection with rock drills. The chuck driver 3 rotates in conventional manner in connection with rock drills. The hammer member 2 in its reciprocation reciprocates the tappet member 1 which in turn reciprocates the drill steel S longitudinally for drilling operation and the drill is rotated by the chuck driver 3 and the chuck member 4 which are operated relatively in torque by means of relatively long spline portions 4a and 3d in their cooperative relation to each other on the chuck driver 3 and chuck member 4. The chuck member 4 is supported by means of the chuck member sleeve 5, it being noted that this chuck member sleeve 5 may rotate relatively to the outer surface 4c of the chuck member 4 or may be static therewith and rotate relative to the inner surface of the front head 9. Thus it will be noted that this sleeve member 5 is free to revolve relatively to the chuck member 4 or be static relatively thereto.

Though I have shown and described a particular construction, combination and arrangement of parts and portions, I do not wish to be limited to this particular construction, combination and arrangement, but desire to include in the scope of my invention the construction, combination and arrangement substantially as set forth in the appended claims.

Having thus described my invention, what I claim as new and desire to secure by Letters Patent is:

1. In a tappet apparatus for rock drills of the class described, the combination of a rotatable chuck driver provided with a bore therein for the reciprocation of the tappet member and provided with a plurality of closely spaced spline members positioned internally in said chuck driver and extending approximately to the inner bore of said driver and a chuck member provided with a plurality of closely spaced spline members adapted to intermesh with the spline members on said chuck driver whereby said chuck member is rotated with the rotation of said chuck driver, said chuck member provided with a bearing portion extending from said spline portion and a sleeve member arranged to form a bearing on the bearing portion of said chuck member and its end adapted to engage the end of both of the splined portions of said chuck member and said chuck driver.

2. In a tappet apparatus for rock drills of the class described, the combination of a rotatable chuck driver provided with a bore therein for the reciprocation of the tappet member and provided with a plurality of closely spaced spline members positioned internally in said chuck driver and extending approximately to the inner bore of said driver and a chuck member provided with a plurality of closely spaced spline members adapted to intermesh with the spline members on said chuck driver whereby said chuck member is rotated with the rotation of said chuck driver, said chuck member provided with a bearing portion extending from said spline portion and a sleeve member arranged to form a bearing on the bearing portion of said chuck member at its end adapted to engage the end of both of the splined portions of said chuck member and said chuck driver, said sleeve provided with a shoulder to form a bearing with thrust bearing rings on the outer side of said sleeve and in cooperative relation with the conventional front head.

HILMER GILLERSTROM.